United States Patent
Chen et al.

(10) Patent No.: US 11,748,364 B2
(45) Date of Patent: Sep. 5, 2023

(54) SCALABLE OBJECT STREAM QUERY FOR OBJECTS IN A DISTRIBUTED STORAGE SYSTEM

(71) Applicant: Red Hat, Inc., Raleigh, NC (US)

(72) Inventors: Huamin Chen, Westford, MA (US); Yehuda Sadeh-Weinraub, Los Angeles, CA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/330,275

(22) Filed: May 25, 2021

(65) Prior Publication Data
US 2022/0382754 A1   Dec. 1, 2022

(51) Int. Cl.
- *G06F 16/2458* (2019.01)
- *G06F 16/28* (2019.01)
- *G06F 16/21* (2019.01)
- *G06F 16/242* (2019.01)

(52) U.S. Cl.
CPC ........ *G06F 16/2471* (2019.01); *G06F 16/219* (2019.01); *G06F 16/2433* (2019.01); *G06F 16/289* (2019.01)

(58) Field of Classification Search
CPC ............... G06F 16/2471; G06F 16/219; G06F 16/2433; G06F 16/289
See application file for complete search history.

(56) References Cited

U.S. PATENT DOCUMENTS

| | | | | |
|---|---|---|---|---|
| 7,222,141 | B2 * | 5/2007 | Zondervan | G06F 16/275 |
| 11,269,871 | B1 * | 3/2022 | Bigdelu | G06F 16/252 |
| 11,347,933 | B1 * | 5/2022 | Cairns | G06F 16/2308 |
| 11,397,750 | B1 * | 7/2022 | Lekakis | G06F 16/2379 |
| 2010/0332489 | A1 * | 12/2010 | Benari | G06F 16/338 718/1 |
| 2013/0275970 | A1 * | 10/2013 | Heim | G06F 11/3072 718/1 |
| 2018/0349482 | A1 * | 12/2018 | Oliner | H04L 41/0681 |
| 2021/0344576 | A1 * | 11/2021 | Sridhar | H04L 67/1004 |

OTHER PUBLICATIONS

Google Cloud, "Dataflow SQL Streaming Extensions", Feb. 23, 2021 (Last Updated), 8 pages.
IBM, "Big Data Logs With Streaming Analytics and SQL", Dec. 28, 2020 (Last Updated), 18 pages.

(Continued)

*Primary Examiner* — Cam Y T Truong
(74) *Attorney, Agent, or Firm* — Lowenstein Sandler LLP

(57) ABSTRACT

Systems and methods for providing scalable object storage query capabilities in a distributed storage system are disclosed. In one implementation, a processing device may receive, by an object-based distributed storage system, a request from a client to execute a query with respect to data stored at the distributed storage system. The processing device may execute the query to produce a result object and may store the result object at the distributed storage system. The processing device may further transmit the result object to the client. The processing device may re-execute the query at a subsequent point in time to update the result object and transmit the updated result object to the client.

20 Claims, 8 Drawing Sheets

(56) References Cited

OTHER PUBLICATIONS

Lefevre Jeff et al, "SkyhookDM: Data Processing in Ceph with Programmable Storage", vol. 45, No. 2, May 31, 2020, pp. 13-18, https://www.usenix.org/system/files/login/articles/login_summer20_03_lefevre.pdf, 6 pages.

Lefevre Jeff et al, "Skyhook: Programmable storage for databases", Vault 19, 2019 Linux Storage and Filesystems Conference, Feb. 26, 2019, pp. 1-37, https://users.soe.ucsc.edu/-jlefevre/skyhookdb/Skyhook-JeffNoah-Vault19.pdf, 37 pages.

"Prepared statement", Wikipedia, Mar. 3, 2017 (https://en.wikipedia.org/w/index.php?title=Prepared_statement&oldid=768463929, 5 pages.

Extended European search report for European application 21198463.8 dated Mar. 24, 2022, 9 pages.

\* cited by examiner

610 — SELECT count(*) FROM table
WHERE age>30 AND age<65
620 — DURATION 5 hours
630 — RESULT result_bucket/result_object [append|override]

SCALABLE OBJECT STREAM QUERY FOR OBJECTS IN A DISTRIBUTED STORAGE SYSTEM

TECHNICAL FIELD

The present disclosure is generally related to computer systems, and more particularly, to scalable object stream query for objects in a distributed storage system.

BACKGROUND

Modern computers often store data in a distributed data store to enhance the access, redundancy, and capacity of data storage devices. The distributed data store may include multiple storage nodes that function to store, organize, and provide access to data. The distributed data store may include a server portion that manages the data and a client portion that provides access to the data. The client portion may include code (e.g., client module) that enables a client device to access data of the distributed data store.

BRIEF DESCRIPTION OF THE DRAWINGS

The present disclosure is illustrated by way of examples, and not by way of limitation, and may be more fully understood with references to the following detailed description when considered in connection with the Figures, in which:

FIG. 6 illustrates an example select query to retrieve data from a distributed storage system and return query execution results in a result object, in accordance with one or more aspects of the present disclosure.

DETAILED DESCRIPTION

Figure 1:
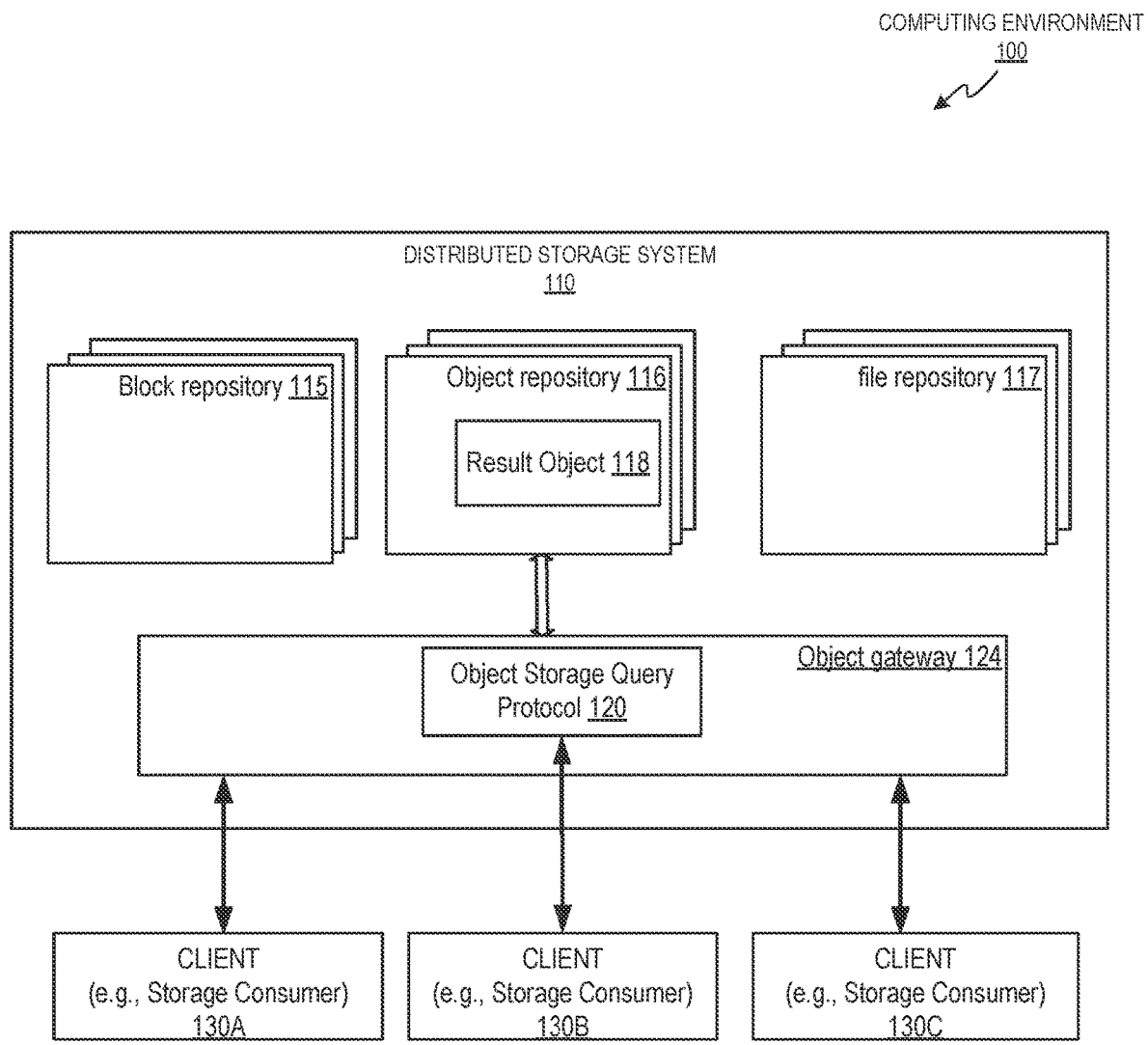
FIG. 1 illustrates an exemplary computing environment in which implementations of the disclosure may operate.

Described herein are methods and systems for providing scalable object stream query for objects in a distributed storage system. Distributed storage systems often incorporate the features of distributed data stores and enable multiple clients to access and modify data of the distributed storage system. The distributed data stores may enhance performance of a computer system, reliability of the computer system, or a combination thereof. The distributed data stores may include a set of physical devices, virtual devices, or a combination thereof. Clients of the distributed system often employ code designed to interact with the distributed storage system via multiple paths to access the data of the distributed storage system. Data may be stored at block-based repositories (e.g., block devices), file-based repositories (e.g., files and directories), object-based repositories (e.g., object-based containers), other repositories, or a combination thereof. Each type of repository may have a dedicated API interface that may be used by clients to access the corresponding repository type.

An object-based repository manages data storage as distinct units, called objects, that may be stored separately and/or within object containers within the distributed storage system. The object storage may combine the items of data that make up a file, may add relevant metadata to the file, and may store both data and metadata in a flat address space called a storage pool.

In certain implementations, an object-based gateway may be used to access objects within an object-based repository. The object-based gateway may implement a RESTful web service interface that is capable of reading and writing immutable data objects (i.e., objects that cannot be modified after being created). REpresentational State Transfer (REST) is a style of software architecture for distributed systems such as the World Wide Web. A RESTful web service is a web service that is implemented using HTTP and the principals of REST. The object-based gateway may further include an object storage query protocol for querying data within an object-based repository.

In some implementations, distributed storage systems offer an object storage query protocol to clients of the storage system to retrieve data from the storage system using SQL queries without attaching to a database, for example using a SQL select query. In many instances, a client may need a continuous view of certain data including updates to the data that may occur after the query has been submitted. In this case, a client may send the same query periodically and may need to handle merging and managing the results of each query on the client side. Managing the data updates on the client side can yield delayed data updates and increase in server workload since each query will be processed independently and prior query results are not reused.

The present disclosure alleviates the above-noted and other deficiencies by expanding the object storage query protocol to enable automatic re-execution of a query submitted by a client of the storage system, in order to enable the client to have continuous and most recent view of certain data stored at the distributed storage system. In certain implementations, the expanded object storage query protocol can include new APIs, new object types to, and/or new processing methods.

In one implementation, an object-based distributed storage system can receive a request from a client of the distributed storage system to execute a certain query to retrieve a set of data stored at the distributed storage system. In an implementation, the query can be a SQL select query specifying a set of parameters including a duration parameter, a result aggregation parameter, and/or a re-execution frequency parameter. The Duration parameter can specify a period of time for retrieving the data requested by the query. In an illustrative example, given a storage repository that stores a temperature of a room every hour, a "Duration 12 hours" parameter can result in retrieving the room temperature for the most recent 12 hours, such that each row in the resulting object can contain one column for the room temperature and another column for the corresponding hour that the temperature was captured, resulting in 12 rows in the result object.

The aggregation parameter can specify the manner of aggregating the data retrieved by the query. In an illustrative example, the aggregation parameter can be represented by a Group By parameter, which specifies combining (grouping) the result rows in which a specified database field has the same value. Given the same example of a storage repository that stores a temperature of a room every hour, a "Duration 12 hours" and "GroupBy temperature" parameters of the query can result in retrieving the room temperature for the most recent 12 hours and group the result by temperature, such that hours that has the same temperature value can be aggregated together in a single row of the resulting object. In this case, each row in the result object can have a column for unique temperature values and another column for the count of occurrence of the corresponding temperature value, resulting in potentially less than 12 rows in the result object.

In at least one implementation, the frequency at which the query should be re-executed can be communicated to the distributed storage system as a ReExecute parameter of the query, specifying the frequency of re-executing the query. In an illustrative example, if the select query has a "ReExecute 6 hours" parameter, given the same example of a storage repository that stores a temperature of a room every hour, a "ReExecute 6 hours" and a "Duration 12 hours" parameters of the query can result in retrieving the room temperature for the most recent 12 hours and then re-executing the query every 6 hours to get an updated set of the most recent 12 hours of room temperature, and so on. Alternatively, the frequency at which to re-execute the query can be determined based on changes in underlying data requested by the query. In this case, when new or updated data is uploaded into the distributed storage system, the storage system can inspect the new data and determine if a related query needs to be re-executed to reflect the changes in the data. If a data change affects data requested by the query, the storage system can re-execute the query and can transmit an updated results object to the client.

In certain implementations, the distributed storage server can execute the query received from the client, according to the parameters provided by the client, and can produce a result object containing the data resulting from the query execution. In one implementation, the result object can be an object that is generated when the corresponding query is executed and can then be stored at an object repository, so that it can be preserved at the storage system for subsequent references by the client. The distributed storage system can further transmit the result object to the client in response to the received query. In one implementation, the client can determine whether to create the result object in the append mode or override mode with respect to new data when the query is re-executed. If the query indicates that the result object should be appended, then the storage system can create the result object at first execution of the query and then when the query is re-executed at a subsequent point in time, new data from re-execution can be appended to existing data in the result object. The result object with the appended data can then be returned to the client after query re-execution. Alternatively, if the query indicates that the result object should be overridden, then the storage system can create the result object at first execution of the query and then when the query is re-executed at a subsequent point in time, new data from re-execution can replace existing data in the result object. The result object with the new data can then be returned to the client after query re-execution.

In certain implementations, the result object can be divided into multiple portions and each portion can be stored as a separate object in the storage system, in order to support the append mode of the result object with no limitations of a maximum size of the result object. In certain implementations, a distributed storage system can have fixed size objects, thus storing the results objects in the form of multiple portions can result in potentially unlimited size for the increasing data size in a result object with an append mode. In an implementation, the storage system can utilize the multiple portions of the result object to track changes to each portion separately, such that when the query is re-executed, the portions that have been changed can be re-processed whereas the portions that have not been changed can be exempted from processing, thus optimizing the re-execution process of the query. In order to track changes of each portion of the result object, each portion can have its own version number that can be used for change tracking and dynamic result generation. In at least one embodiment, each portion of the result object can have a version number that can be incremented each time data of the portion is changed. The portion can further have a timestamp indicating the most recent update of data within the portion. In certain implementations, the version number and timestamp of the portion can be stored in metadata about the portion at metadata tables within the storage system, such that a new version number is created and added to the metadata table for the portion each time data of the portion has been changed.

Additionally, the result object can have a separate version number for tracking changes across one or more portions of the result object. The storage system can use a mapping table to associate the version number of the result object with a corresponding version number of each portion. In this case, when the result object is updated, a new version of the object is generated and a new row is inserted in the mapping table for the new version of the result object. For each portion of the result object, the most recent version of the portion is included in the new row that is created for the new version of the result object, such that when the corresponding query is re-executed in the append mode, only portions having an updated version number would need to be processed to retrieve data to be appended to the result object before sending the result object to the client.

In some implementations, upon receiving a query from a client, the distributed storage server can compile the query into executable code and cache the executable code of the query in memory for subsequent execution, such that the query can be compiled once to generate the executable code and then re-executed multiple times without having to recompile the query. In an implementation, once the query is compiled into executable code, it is cached throughout the lifecycle of the query stream between the client and the storage system. In an implementation, the query stream may refer to the connection between the client and the storage system (e.g., SQL connection) and the lifetime of the stream refers to the period of time that the connection between the client and server is active, for example until the connection expires or is terminated by the client or the storage server.

In an implementation, when the client submitting the query receives an updated result object after re-execution of the query, the client may process a dataset within the result object to update data structure, objects, and/or user interfaces on the client side based on the new data. As an example, the client may refresh a user interface that is linked to the result object on a program of the client to reflect changes in the data. For example, if the result object is in an append mode, new rows appended to the dataset of the result object may now be included in the user interface. On the other hand, if the result object is in an override mode, the new dataset of the result object may now replace a previously provided dataset in the user interface that is linked to the result object.

Thus, the systems and methods described herein represent improvements to the functionality of general purpose or specialized computing devices, by implementing a scalable and efficient object stream query for objects stored at a distributed storage system. The ability to provide a result object that can be stored and updated throughout the lifetime of the stream between the client and storage server enables an automatic re-execution of the query on the server side. This automatic re-execution of the query enables the updated results to be transmitted to the client timely and automatically, thus minimizing the addition processing on both server and client sides for processing multiple independent queries for the updated data. Additionally, the ability to manage and track versions of parts of result data separately results in reduced processing time when a query is re-executed because only parts with an updated version since last execution can be processed when the query is re-executed, thus improving the overall performance of the storage system.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 illustrates an exemplary computing environment 100 in which implementations of the disclosure may operate. Computing environment 100 may include multiple computing devices associated with one or more cloud environments, data centers, data rooms, other arrangement of devices, or a combination thereof. In one example, computing environment 100 may include a distributed storage system 110 (e.g., storage provider), one or more data access repositories 115-117 (e.g., blocks, objects, file storage), and one or more clients 130A-C (e.g., storage consumers).

Distributed storage system 110 may store and manage the distribution of data across multiple storage nodes and may provide access to data via various interfaces including object-based gateway interface 124. Object gateway 124 may provide access to immutable data objects using an object-based gateway (e.g., a RESTful web service interface). In one example, distributed storage system 110 may be the same or similar to Ceph, Gluster, Oracle® Automatic Storage Management (e.g., ASM), Hadoop® Distributed File System (HDFS), Andrew File System (AFS), Google® File System (GFS), Amazon® AWS S3, Microsoft® Azure blob storage, Google® Cloud storage, other data storage system, or a combination thereof that is capable of storing object data (e.g. content) on one or more storage nodes.

Block repositories 115 represents block-based storage and may include multiple block devices for storing mutable data objects within distributed storage system 110. In an implementation, block-based storage interfaces may be used to store data within media devices such as hard disks, CDs, floppy disks, and a combination thereof. Block repositories 115 may store data over multiple object storage daemons (OSDs) within a storage cluster. In certain implementations, block repositories 115 may leverage the reliable autonomic distributed object store (RADOS) capabilities such as snapshot creation, replication, and fault-tolerance. RADOS is an open source object storage service that is an integral part of distributed storage system 110 (e.g., Ceph storage system). In this case, a RADOS block device (RBD) interface may interact with storage nodes to store and retrieve data using kernel modules.

Object repositories 116 represents an object-based repositories within distributed storage system 110. In certain implementations, object repositories 116 may be immutable data objects (i.e. objects that cannot be modified after being created) that may be accessed using an object gateway 124. In an illustrative example, object gateway 124 may leverage the reliable autonomic distributed object store (RADOS) capabilities such as snapshot creation, replication, and fault-tolerance. In this case, the RADOS gateway (RGW) can be in the form of a RESTful web service interface that may read and write data to object repositories 116. Object gateway 124 may use object-based proxy containers for accessing object repositories 116. Object-based proxy containers refer to a special type of hierarchical metadata used for identifying the number and location of objects used for storing certain data (e.g., data of a certain user or client of distributed storage system 110). In an illustrative example, a client 130A-C may access object repositories 116 using a select query via object gateway 124 for viewing objects within the object-based repository 116. The result of the query can be returned to client 130 A-C within result object 118.

Result object 118 represents a virtual object that is created by distributed system 110 after executing a query from client 130A-C to include data resulting from the query execution. In this case, a virtual object refers to an object that is created on demand, for the purpose of containing results of executing a query, and that can be discarded when a connection between a client 130A-C submitting the query and distributed storage system 110 is terminated. In one implementation, storage system 110 stores result object 118 at an object repository 116, so that it can be preserved at storage system 110 for subsequent retrieval by client 130A-C. Distributed storage system 110 further transmits result object 118 to client 130A-C in response to the received query. In one implementation, result object 118 can be created in append mode or override mode, with respect to new data when the query is re-executed. When result object 118 is in append mode, storage system 110 can create result object 118 at first execution of the query and then when the query is re-executed at a subsequent point in time, new data from re-execution can be appended to existing data in result object 118. On the other hand, result object 118 is in override mode, storage system 110 can create result object 118 at first execution of the query and then when the query is re-executed at a subsequent point in time, new data from re-execution can replace existing data in result object 118.

In certain implementations, result object 118 can be divided into multiple portions and each portion can be stored as a separate object at object repositories 116, in order to support the append mode of the result object with no limitations of a maximum size of result object 118. In an implementation, storage system 110 can utilize the multiple portions of result object 118 to track changes to each portion separately, for example by tracking a separate version number for each portion, such that when the query is re-executed, the portions that has been changed can be re-processed whereas the portions that has not been changed can be exempted from processing for retrieving and formatting updated data, thus optimizing the re-execution process of the query. In one embodiment, each portion of result object 118 can have a version number that can be incremented each time data of the portion is changed. Further, result object 118 can have a separate version number for tracking changes across the one or more portions of result object 118. Storage system 110 can use a mapping table to associate the version number of result object 118 with a corresponding version number of each portion, such that when result object 118 is updated, a new version of the object is generated and a new row is inserted in the mapping table for the new version of result object 118 and the most recent version of each portion of result object 118 is included in the new row, as explained in more details herein below.

Object gateway 124 supports object storage query protocol 120 that clients 130 A-C can use to execute queries against object repositories 116 in order to retrieve data stored at object repositories 116. Object storage query protocol 120 can be a set of rules for providing scalable object storage access through a service interface using select queries that can be used to retrieve data from object repositories 116 (e.g., using SQL) without attaching to a specific database. In certain implementations, in order to enable continuous and updated view of the data requested by a query, for example by re-executing the query periodically, object storage query protocol 120 can provide a set of application programming interfaces (APIs) to enable continuous and automatically updated view of certain data that a client 130A-C is requesting from distributed storage system 110. In an implementation, object storage query protocol 120 can provide a select query API specifying a set of parameters including a Duration parameter, an aggregation parameter, and/or a ReExecute parameter, with a new object type as the output of the select query new API. The return type can be result object 118 representing a virtual object that can be created to contain the data resulting from executing the query, and that can be stored at the storage system 110 as explained in more details herein above.

In some implementations, the Duration parameter specifies a window of time filter for the data requested by the query, such that when the query is executed only data having a date or timestamp within the duration window is included in the results. The aggregation parameter can be a GroupBy parameter that results in aggregation of data retrieved by the query, such that a client can have the resulting data at different resolutions, according to the data field included in the GroupBy clause, as explained in more details herein above. The ReExecute parameter specifies the frequency at which the query can be re-executed after the initial execution, such that the result object associated with the query can be updated and sent to client 130 A-C after re-executing the query at the frequency specified by the ReExecute parameter.

File repositories 117 represents a file-based repository within distributed storage system 110. In certain implementations, file repositories 117 may be mutable files and directories stored at various media devices such as hard disks, CDs, tapes, or a combination thereof. Files repositories 117 may be accessed using a file system interface. In an illustrative example, a client 130A-C may access File repositories 117 for viewing, updating, deleting, or creating files and directories within the file-based repository.

Clients 130A-C may be computing devices that access data hosted at distributed storage system 110. Clients 130A-C may each include a client portion of the object access service (e.g., standardized storage access technology) and may function as a client (e.g., storage consumer) of one or more of the storages nodes (e.g., blocks, objects, files).

The client portion of the object access service may execute at any level of privilege such as running as part of a kernel or in a kernel mode (e.g., supervisor, master, privileged mode) or as part of a user space in user mode. Object access service may be packaged with an operating system or may be added or installed to an existing operating system. In one example, object access service may include a mount process (e.g., daemon, service) that runs on clients 130A-C and may support an operating systems native API. The native API may be any standardized or proprietary operating system API, such as the Portable Operating System Interview (POSIX) API or the Microsoft Windows® API.

Clients 130A-C may be physical devices (e.g., physical machines), virtual devices (e.g., virtual machines, containers), or a combination thereof. One or more of the clients may be absent virtualization technology and one or more of the clients may provide one or more levels of virtualization. The levels of virtualization may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Computing environment 100 may include one or more networks. The one or more networks may include a public network (e.g., the internet), a private network (e.g., a local area network (LAN) or wide area network (WAN)), or a combination thereof. In one example, the network may include a wired or a wireless infrastructure, which may be provided by one or more wireless communications systems, such as a wireless fidelity (WiFi) hotspot connected with the network and/or a wireless carrier system that may be implemented using various data processing equipment, communication towers, etc.

Figure 2:
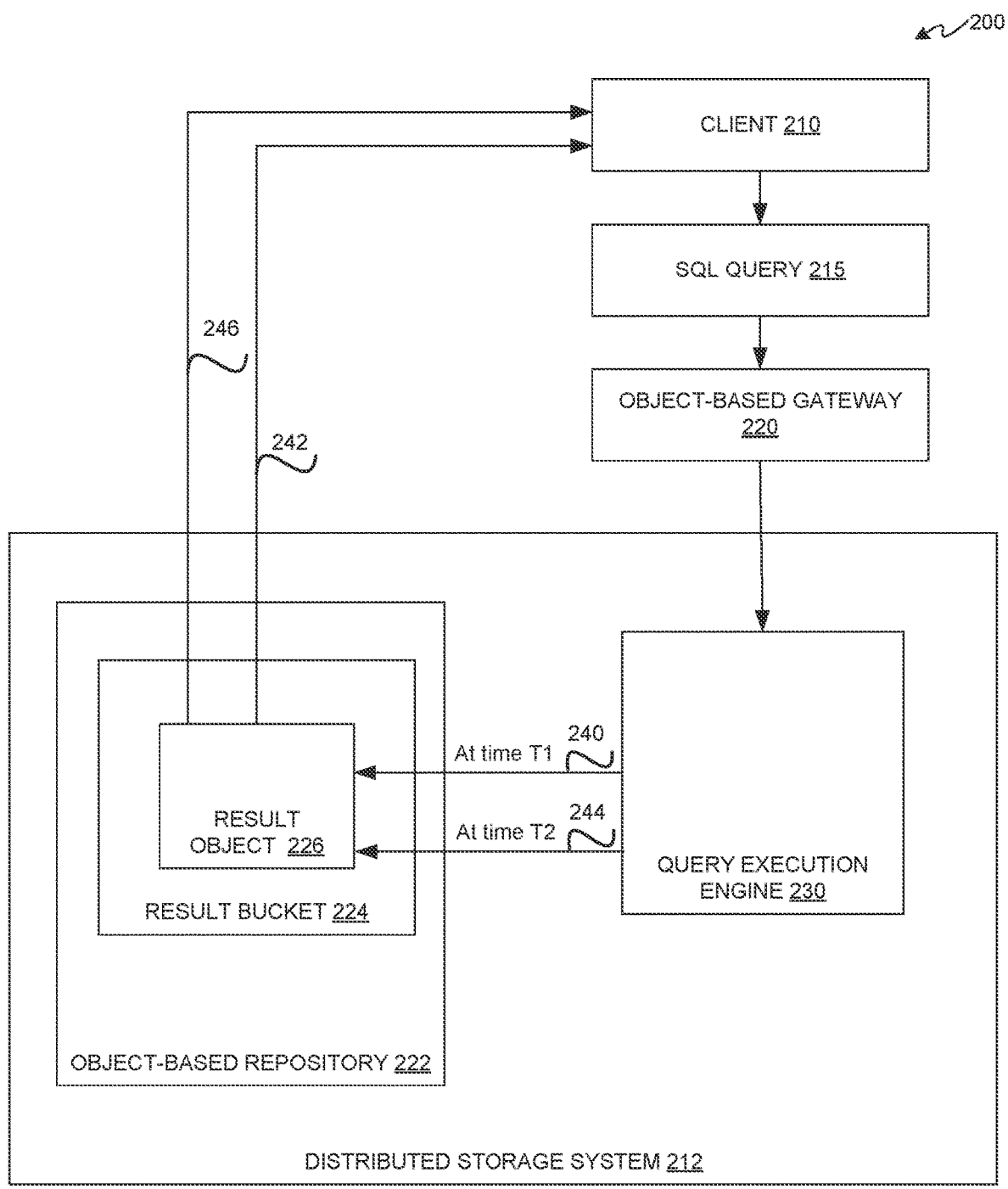
FIG. 2 illustrates the process of automatically re-executing a query from a client to retrieve data from a distributed storage system and sending an updated results object to the client responsive to the re-execution of the query, in accordance with one or more aspects of the present disclosure.

FIG. 2 illustrates the process of automatically re-executing a query from a client to retrieve data from a distributed storage system and sending an updated results object to the client responsive to the re-execution of the query, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., the computer system 500 of FIG. 5 or apparatus 700 of FIG. 7) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

In an implementation, distributed storage system 212 may be the same or similar to distributed storage system 110 of FIG. 1. Distributed storage system 212 may contain an object-based repository 222. In other implementations, distributed storage system 212 may include multiple object-based repositories. Client 210 of distributed storage system 212 may access object-based repository 222 using object-based gateway 220. In an illustrative example, object-based gateway 220 may be a RESTful web service that may provide an API to client 210 for accessing immutable data objects stored at object-based repository 222, for example using an object storage query protocol provided by object-based gateway 222. In this case, client 210 may send a query 215 (e.g., a SQL query) via object-based gateway 220 to retrieve data from object-based repository 222 by executing SQL query 215 according to parameters of SQL query 215.

Query execution engine 230 represents a processing logic responsible for executing and further re-executing queries received from client 210. In certain implementations, when query execution engine 230 receives SQL query 215, query execution engine 230 compiles SQL query 215 into executable code and caches the executable code of the query in memory for subsequent execution. In this case, query execution engine 230 can compile SQL query to generate the executable code once and then store the executable version of the query such that it can be re-executed at a subsequent point in time without having to recompile SQL query 215. Method 200 uses SQL query as an example query language for illustrating the process of automatically re-executing a query from a client. Some implementations of the present disclosure include the use of other query languages to implement aspects of the present disclosure.

At operation 240, query execution engine 230 executes the executable code corresponding to SQL query 215 and creates result object 226 that includes the data resulting from executing the query, at time T1. In certain implementations, query execution engine 230 can store timestamp T1 within metadata associated with result object 226, such that T1 is the time of the most recent update of result object 226. Query execution engine 230 may further store result object 226 within result bucket 224 of object-based repository 222. Result bucket 224 may refer to a storage container that is used for storing and grouping objects containing data as well as descriptive metadata of the objects, similar to folders and directories containing files in a file system repository. At operation 242, query execution engine 230 transmits result object 226 with the result of the execution of SQL query 215 to client 210.

At operation 244, query execution engine 230, at time T2, can re-execute the executable code corresponding to SQL query 215. In an implementation, query execution engine 230 can determine time T2 for re-executing SQL query 215 based on a ReExecute parameter of SQL query 215 specifying a frequency of re-executing the query. For example, a "ReExecute 1 hour" parameter results in re-executing SQL query 215 every one hour. In another implementation, query execution engine 230 can determine time T2 for re-executing SQL query 215 based on detecting a change in data within object-based repository 222 that is associated with SQL query 215. As an example, when new or updated data is uploaded into distributed storage system 212, query execution engine 230 can inspect the new data and determine whether it is related to data requested by SQL query 215. If the new or updated data is related to SQL query 215, query execution engine can re-execute the executable code corresponding to SQL query 215 to update contents of results object 226 based on the changes in the data.

Data within result object 226 can be updated, based on re-execution of the corresponding query, in either an append mode or an override mode. If SQL query 215 indicates that the result object should be in append mode, then query execution engine 230 can append new data from re-execution of SQL query 215 at time T2 to existing data in result object 226 that was executed at time T1. Alternatively, if SQL query 215 indicates that the result object should be in the override mode, then query execution engine 230 can replace existing data in result object 226 that was executed at time T1 with new data from re-execution of SQL query 215 at time T2. Query execution engine 230 can then store timestamp T2 within metadata associated with result object 226, as the time of last update of result object 226. At operation 246, query execution engine 230 transmits updated result object 226 with the result of the re-execution of SQL query 215 to client 210, thus providing an automatically updated view of query results of SQL query 215 including changes in underlying data requested by SQL query 215.

Figure 3:
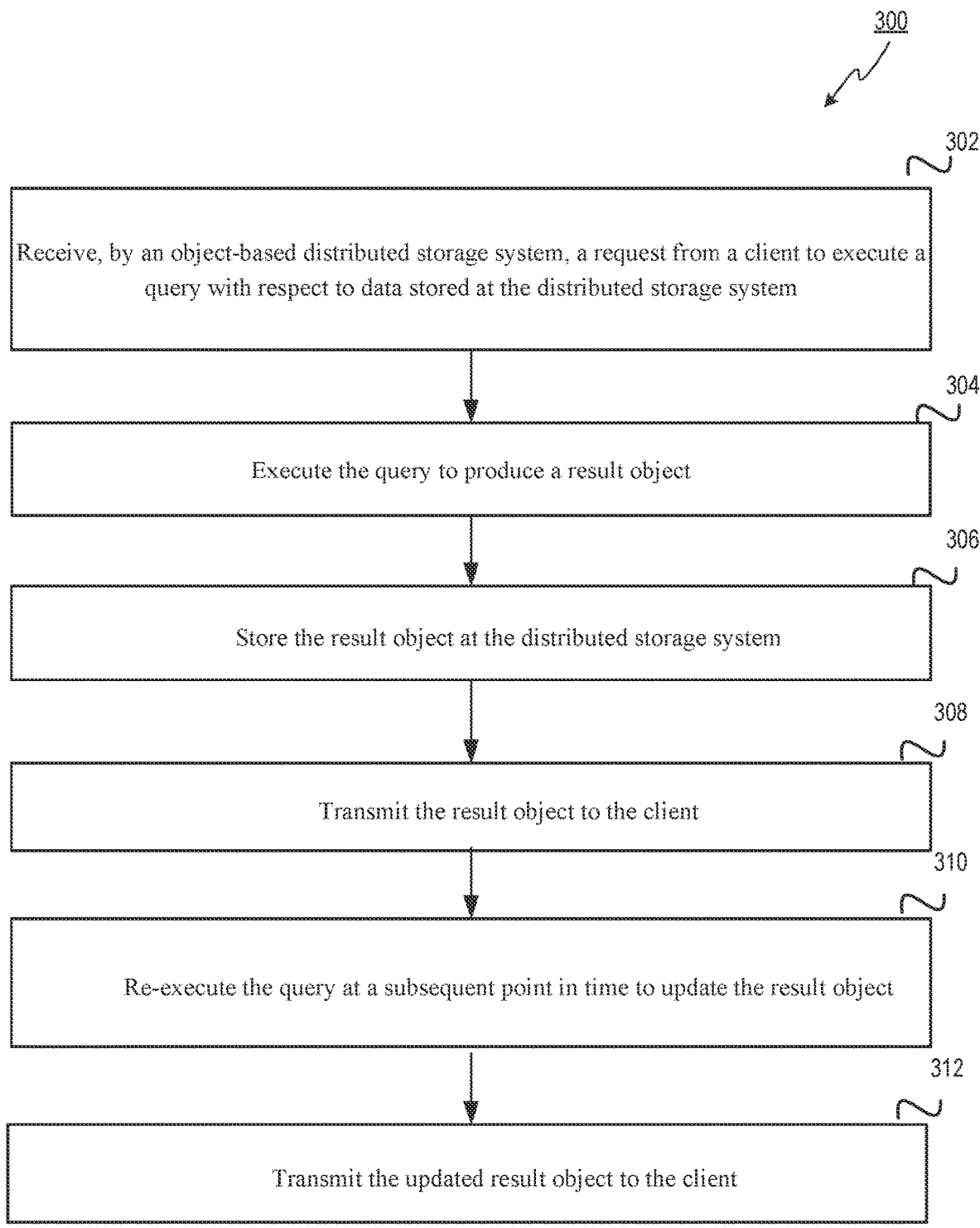
FIG. 3 is a flow diagram of an example method of supporting automatically updated query results for data requested by a client of a distributed storage system based on parameters of the query, in accordance with one or more aspects of the present disclosure.

FIG. 3 is a flow diagram of an example method of updating query results for data requested by a client of a distributed storage system based on parameters of the query, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 500 of FIG. 5 or apparatus 700 of FIG. 7) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Referring to FIG. 3, at operation 302, the processing logic executing at an object-based distributed storage system may receive a request from a client of the system to execute a query to retrieve data stored at the distributed storage system. In an implementation, the query can include a Duration parameter specifying a time frame for filtering data retrieved by the query, an aggregation parameter specifying a data field for aggregating the data retrieved by the query, and/or a ReExecute parameter indicating a frequency for re-executing the query, as explained in more details herein.

At operation 304, the processing logic may execute the query to produce a result object. In some implementations, the result object may be a virtual object that is created to contain data resulting from executing the query in either an append mode or an override mode. At operation 306, the processing logic may store the result object at the distributed storage system so that it can be preserved for further re-execution and/or further access by the client, as explained in more details herein. In some implementations, the result object may consist of multiple portions that are stored separately and tracked for updated separately with corresponding version numbers.

At operation 308, the processing logic can transmit the result object to the client. In an implementation, the processing logic may provide a set of APIs to the client for accessing data stored at the results object as well as APIs for refreshing data within the result object to reflect the most recent updates to data stored at the distributed storage system. At operation 310, the processing logic may re-execute the query at a subsequent point in time to update contents of the result object. In certain implementations, the processing logic may re-execute the query according to a frequency determined by the ReExecute parameter of the query. In other implementations, the processing logic may re-execute the query based on changes in underlying data pertaining to the query, as explained in more details herein.

At operation 312, the processing logic may update the result object based on results from re-executing the query and may transmit the updated result object to the client. In an implementation, the results from re-executing the query may be appended to existing data within the result object. In other implementations, the results from re-executing the query may replace existing data within the result object, as explained in more details herein above.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. Each method described herein and/or each of its individual functions, routines, subroutines, or operations may be performed by one or more processing devices of the computer system (e.g., computer system 100 of FIG. 1) implementing the method. In certain implementations, the method may be performed by a single processing thread. Alternatively, the method may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). Alternatively, the processing threads implementing the method may be executed asynchronously with respect to each other.

Figure 4:
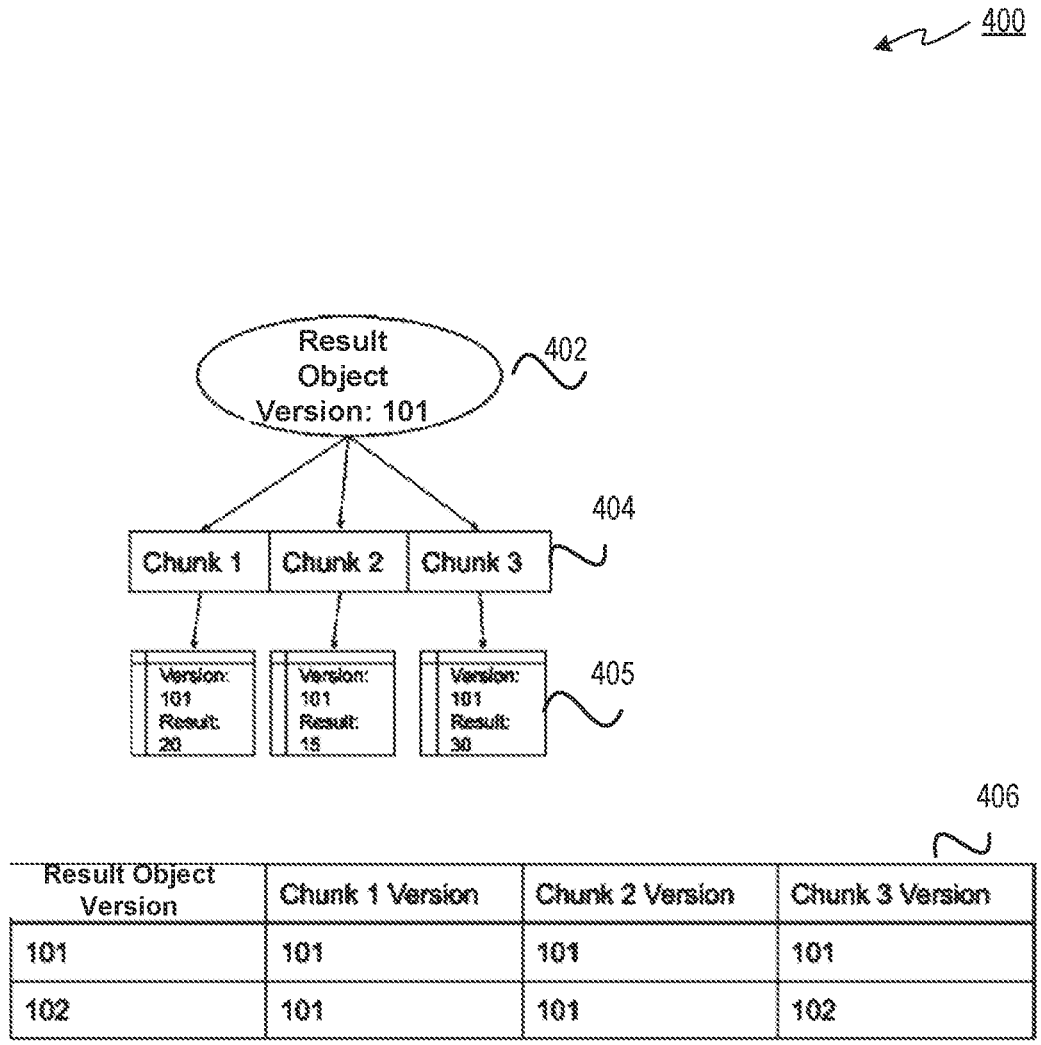
FIG. 4 illustrates an example method for version tracking of multiple parts of a result object of a query using a mapping table, in accordance with one or more aspects of the present disclosure.

FIG. 4 illustrates an example method for version tracking of multiple parts of a result object of a query using a mapping table, in accordance with one or more aspects of the present disclosure. Method 400 may be performed by a processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 500 of FIG. 5 or apparatus 700 of FIG. 7) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

In one implementation, a processing logic can create result object 402 with version 101. Result object 402 can consist of 3 portions 404 and each portion can be a chunk having a corresponding version number 405 starting at 101. In one implementation, the processing logic divides result object 402 into chunks. Each chunk can have an offset from a certain starting address of a storage location, a maximum size, and a size of data in the chunk. In this case, since the chunks follow each other in storage they can have the same storage properties thus can perform consistently. In some implementations, the processing logic can perform object entity tag (ETag) calculation based on the number of parts in the result object for verifying the contents of the object. Object ETag refers to entity tag that can be stored in an HTTP header and used for cache validation and conditional requests from browsers for resources, such that when a cached resource has a valid ETag, the resource can be used from a cache instead of being reloaded. The processing logic can calculate a hash of every chunk 404 and can store the hash values of all chunks at the last chunk. When calculating the ETag of the result object, the processing logic can then reference the stored hash values in one location and use the hash values in calculating the ETag value for validating contents of the result object 402.

In an implementation, after creating result object 402 and the associated chunks 404, the processing logic can insert a row in mapping table 406 for tracking the version of the created result object 402 and the corresponding version number of each of the chunks 404, such that the inserted row can have a data field for the version number of the result object as well as separate data fields for each of the chunks 404. In this case, the version number of result object 402 and the version number of each of chunks 404 is 101.

In some implementations, when result object 402 is updated, the processing logic assigns a new version number (e.g., incremented version number) to object result 402. The processing logic then determines which of chunks 1-3 has been has been affected by the update of result object 402. The processing logic can then assign a new version to the updated chunk, in this case chunk 3. Consequently, the processing logic inserts a new tuple to mapping table 406 reflecting the updated version numbers. The new row inserted in mapping table 406 can have version 102 for chunk 3 and for result object 402 and version 101 for chunks 1 and 2 that has not been changed.

In certain implementations, when a query associated with result object 402 is re-executed resulting in updated data in result object 402 and in one or more associated chunks, the processing logic can reference the mapping table to retrieve the most recent version of result object 402 and the associated version number of each chunk, then aggregate the data of the retrieved chunks based on aggregation parameters of the query. The processing logic then can transmit the aggregated result object 402 to the client. In an implementation, when the client receives the updated result object 402, the client can process the dataset within the result object and refreshes user interfaces or other structures on the client to reflect changes in the data. For example, if the result object is in an append mode, new rows appended to the dataset of the result object may now be included in a user interface linked to the result object. On the other hand, if the result object is in an override mode, the new dataset of the result object may now replace a previously provided dataset in the user interface linked to the result object.

Figure 5:
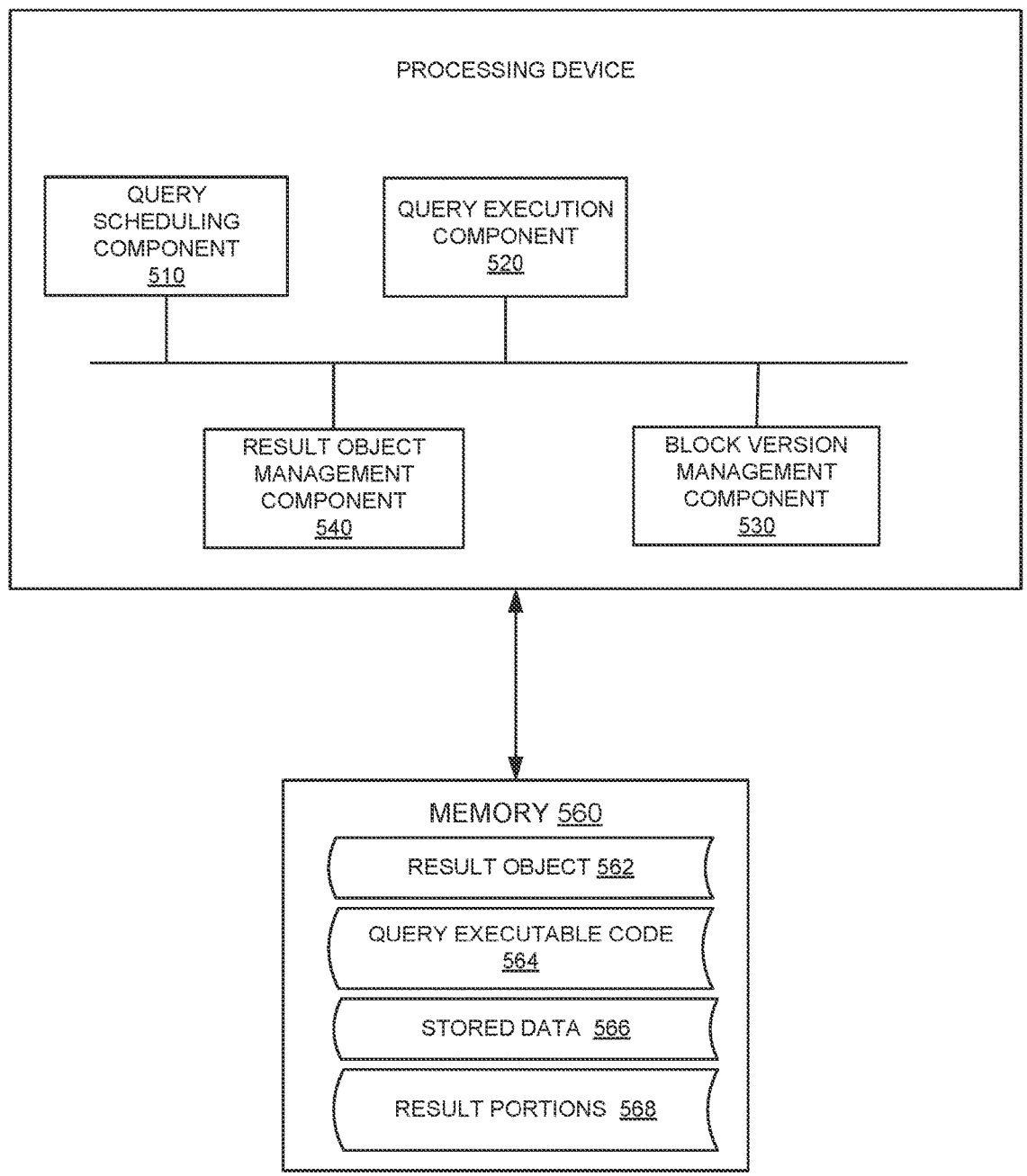
FIG. 5 depicts a block diagram of an example computer system in accordance with one or more aspects of the present disclosure

FIG. 5 depicts a block diagram of an example computer system 500 in accordance with one or more aspects of the present disclosure. Computer system 500 may include one or more processing devices and one or more memory devices. Memory 560 of computer system 500 may be a main memory (e.g., read-only memory (ROM), flash memory, dynamic random access memory (DRAM) such as synchronous DRAM (SDRAM) or Rambus DRAM (RDRAM), etc.), a static memory (e.g., flash memory, static random access memory (SRAM), etc.), a secondary memory (e.g., a data storage device), and/or a combination thereof. In the example shown, computer system 500 may include a query scheduling component 510, a query execution component 520, a portion version management component 530, and a result object management component 540. Components of computer system 500 may access memory 560 to implement methods in accordance to aspects of the disclosure.

Query scheduling component 510 enables a processing device of computer system 500 to re-execute a query received from a client of computer system 500 according to a specific schedule or occurrence of a certain condition, to retrieve relevant records from stored data 566. In one implementation, query scheduling component 510 processes a ReExecute parameter of the query that specifies the frequency of re-executing the query. As an example, the frequency can be specified as a time period of a number of seconds, minutes, or hours such that query executable code 564 corresponding to the query can be re-executed at the specified time period periodically and the results of the re-execution of the query can be sent to the client in an updated result object. In other implementations, query scheduling component 510 determines the frequency at which to re-execute the query based on changes in underlying stored data 566 that is relevant to the query. In this case, when new or updated stored data 566 is uploaded into memory 560, query scheduling component 510 can inspect the new data and determine if a related query needs to be re-executed to reflect the changes in the data. If the data change is pertinent to the query, query scheduling component 510 re-executes query executable code 564, updates result object 562 based on query re-execution results, and transmits an updated result object 562 to the client.

Query execution component 520 enables a processing device of computer system 500 to parse and process parameters of a query received from a client of computer system 500, compile the query into an executable code, and execute and then store the compiled query. In one implementation, when query execution component 520 receives a query, query execution component 520 compiles the query into query executable code 564 and stores query executable code 564 in memory 560 for subsequent execution. Query execution component 520 can further process one or more parameters included in the query and execute the query according to the requested parameters. In some implementations, query execution component 520 processes a Duration parameter to retrieve a window of time filter for the data requested by the query, such that when the query is executed only data having a create or update date within the duration window is included in the results. Query execution component 520 further processes an aggregation parameter (e.g., a GroupBy parameter) to aggregate data retrieved by the query, such that a client can have the resulting data at different resolutions, according to the data field included in the GroupBy clause. In this case, records of data having the same value for the GroupBy field can be aggregated together into one record in result object 562, as explained in more details here above.

Query execution component 520 also processes a ReExecute parameter to retrieve the frequency at which the query can be re-executed after the initial execution, such that result object 562 associated with the query can be updated and sent back to the client after re-executing the query at the frequency specified by the ReExecute parameter. In an implementation, the frequency specified in the ReExecute parameter can be passed to query schedule component 510 for scheduling the query re-execution accordingly. In some implementations, query execution component 520 passes results of executing the query to result object management component 540 for creating and managing result object 562.

Result object management component 540 enables a processing device of computer system 500 to create and update result object 562 to contain data resulting from executing a client query. In an implementation. Result object management component 540 creates result object 562 as a virtual object after executing a query from the client to include resulting data. Result object management component 540 further store result object 562 at memory 560 so that it can be preserved for subsequent references by the client and/or subsequent re-executions of the corresponding query. Result object management component 540 further transmits result object 562 to the client in response to the received query. In one implementation, result object management component 540 creates result object 562 either in append mode or override mode, with respect to new data when the query is re-executed. When result object 562 is in append mode, result object management component 540 creates result object 562 at first execution of the query and then when the query is re-executed at a subsequent point in time, new data from re-execution can be appended to existing data in result object 562. Conversely, when result object 562 is in override mode, result object management component 540 creates result object 562 at first execution of the query and then when the query is re-executed at a subsequent point in time, new data from re-execution can replace existing data in result object 562.

After executing or re-executing a client query, result object management component 540 returns result object 562 to the client with resulting data from executing or re-executing the query. In certain implementation, result object 562 consists of multiple portions 568, each portion containing a part of data pertaining to result object 562. Each of portions 568 can have a separate version number for tracking updates to each portion. Portion version numbers and its association with result object 562 can be managed by portion version management component 530.

Portion version management component 530 enables a processing device of computer system 500 to create and manage portions 568 that constitute result object 562. In certain implementations, result object 562 can be divided into portions 568 and each portion can be stored as a separate object, in order to support the append mode of result object 562 with no limitations of a maximum size of result object 562. In an implementation, portion version management component 530 utilizes portions 568 of result object 562 to track changes to each portion separately, for example by tracking a separate version number for each portion of portions 568. In one implementation, when the query corresponding to result object 562 is re-executed, portion version management component 530 can determine the subset of portions 568 that has been changed and can only re-process the changed portion when re-executing the query. In this case, portion version management component 530 excludes the subset of portions 568 that has not been changed from re-processing, thus optimizing the re-execution process of the query.

In some implementations, portion version management component 530 assigns a version number to each portion 568 of result object 562 and increments the version number each time data of the portion is changed. Further, portion version management component 530 assigns a separate version number to result object 562 for tracking changes across the one or more portions 568 of result object 562. In an implementation, portion version management component 530 uses a mapping table to associate the version number of result object 562 with a corresponding version number of each of portions 568, such that when result object 562 is updated, a new version of the result object is generated and a new row is inserted in the mapping table for the new version of result object 562 and the most recent version of each of portions 568 of result object 562 is included in the new row.

FIG. 6 illustrates an example select query to retrieve data from a distributed storage system and return query execution results in a result object, in accordance with one or more aspects of the present disclosure. In an implementation, query 600 may be a select query for retrieving a number of patients who visited a clinic having an age between 30 and 65. Query 600 can have clause 610 indicating that the select query is to return count (*), e.g., the number of patients, form a given table at the distributed storage system. Query 600 may also include a where clause (Where age >30 AND age <65) indicating the age range of the patients to be retrieved as a result of the query. In this case, age is a column in the table of patients.

Query 600 may further include a "Duration 5 hours" parameter 620 indicating a time frame of 5 hours so that only patients records that was created in the table within the last 5 hours, from the time of executing the query, are to be retrieved by query 600. In this case, when query 600 is re-executed at a subsequent point in time, the retrieved set of patients will include patients records that was created in the table within the last 5 hours, from the time of re-executing the query, and so on.

Query 600 can include Result clause 630 identifying a result_object within a result_bucket to contain the data resulting from executing query 600. Result clause 630 can further specify whether result_object is created in append mode or in override mode. If the Result clause indicates that the result_object should be created in append mode, then a processing logic executing query 600 can create the result_object at first execution of query 600 to include patients who have signed in at the clinic within the last 5 hours and have an age between 30 and 65, and then when query 600 is re-executed at a later point in time, for example after 10 hours from first query execution, new patients who have signed in within the last 5 hours from the time of re-executing query 600 can be appended to existing set of patients in the result_object. The result_object with the appended patient data can then be returned to the client after re-execution of query 600. Alternatively, if query 600 indicates that the result_object should be created in override mode, then the processing logic executing query 600 can create the result_object at first execution of query 600 to include patients who have signed in at the clinic within the last 5 hours and have an age between 30 and 65. Subsequently, when query 600 is re-executed at a later point in time, for example after 10 hours from first query execution, new patients who have signed in within the last 5 hours from the time of re-executing query 600 can replace existing set of patients in the result_object. The result_object with the new set of patients can then be returned to the client after query re-execution.

Figure 7:
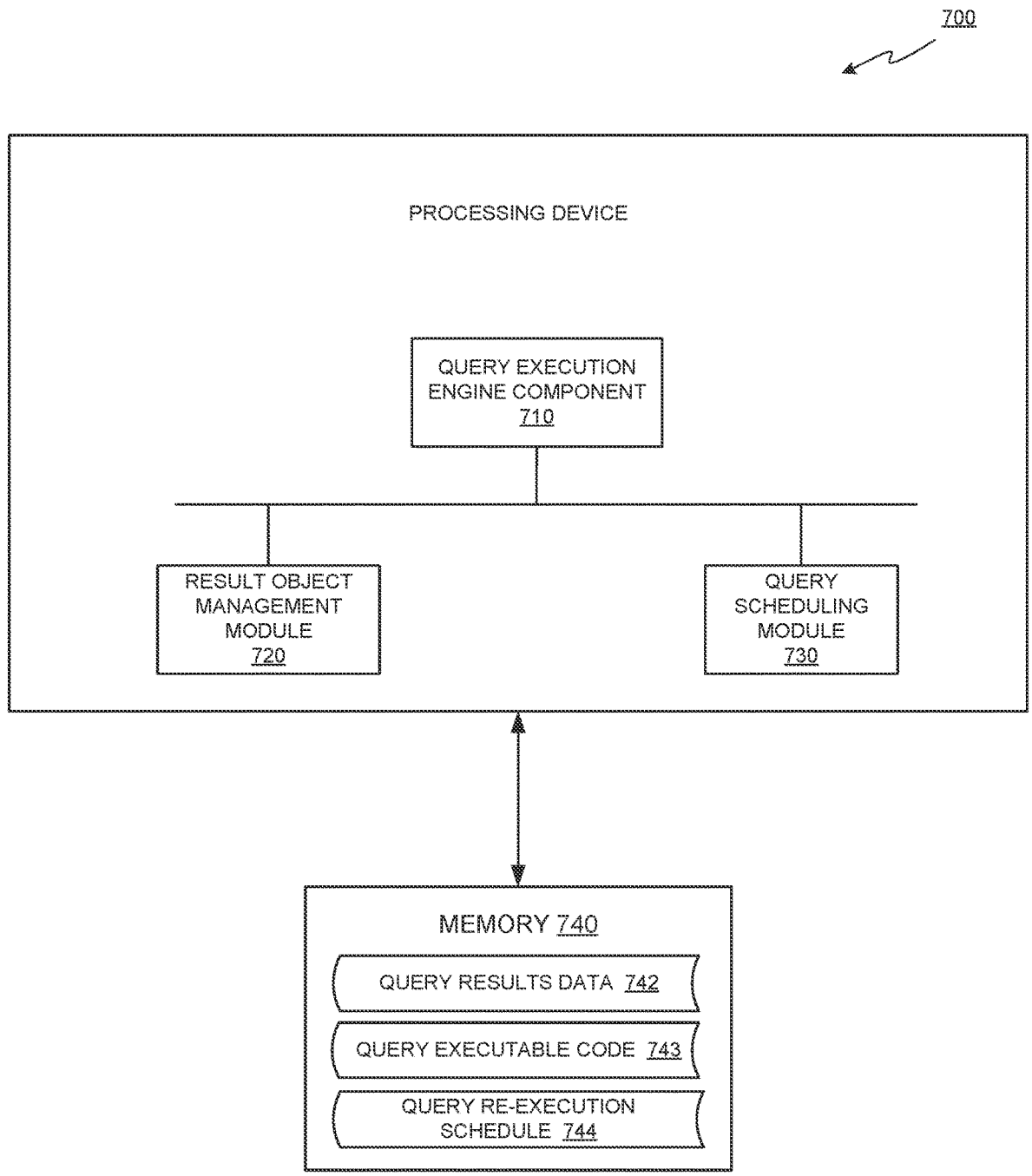
FIG. 7 depicts a block diagram of an illustrative apparatus operating in accordance with one or more aspects of the disclosure.

FIG. 7 depicts a block diagram of an illustrative apparatus 700 operating in accordance with one or more aspects of the disclosure. In various illustrative examples, apparatus 700 may be represented by computer system 100 of FIG. 1. Apparatus 700 comprises a memory 740 and processing device operatively coupled to the memory 740 and executes code implementing query execution engine component 710, result object management module 720, and query scheduling module 730. Memory 740 may store query result data 742 representing a result object as well as associated portions comprising the result object that are created and managed by result object management module 720 after a query is executed. Query execution engine component 710 may compile a query received from a client into query executable code 743 that can be stored in memory 740 for further re-execution at a subsequent point in time. Memory 740 may further store query re-execution schedule 744 that can be created and then invoked by query scheduling module 730 for periodically re-executing query executable code 743 and updating query result data 742 based on query re-execution schedule 744. The processing device of apparatus 700 may include query execution engine component 710 operating in accordance with one or more aspects of the present disclosure. In an illustrative example, query execution engine component 710 may implement methods 200, 300, 400 and/or 600 of FIGS. 2, 3, 4, and 6.

Figure 8:
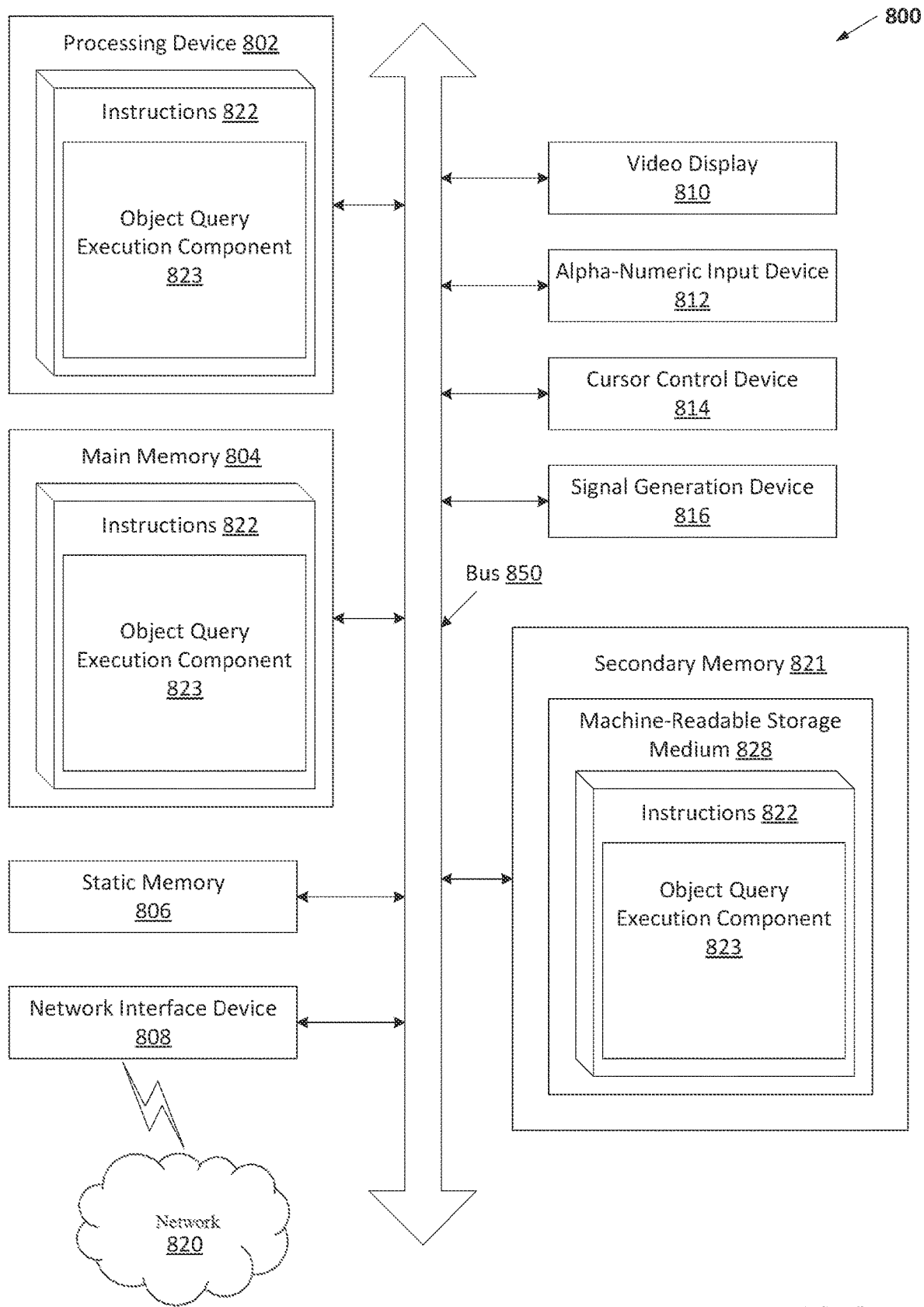
FIG. 8 illustrates a diagrammatic representation of a machine in the exemplary form of a computer system, in accordance with one or more aspects of the present disclosure.

FIG. 8 illustrates a diagrammatic representation of a machine in the exemplary form of a computer system 800 within which a set of instructions, for causing the machine to perform any one or more of the methodologies discussed herein, may be executed. The computer system 800 may correspond to computer system 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device), which communicate with each other via a bus 850.

The processing device 802 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 821 may include a machine-readable storage medium (or more specifically a computer-readable storage medium) 828 on which is stored one or more sets of instructions 822 embodying any one or more of the methodologies or functions described herein (e.g., object query execution component 823). The instructions 822 may also reside, completely or at least partially, within the main memory 804 and/or within the processing device 802 during execution thereof by the computer system 800; the main memory 804 and the processing device 802 also constituting machine-readable storage media.

While computer-readable storage medium 828 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300-400 of FIGS. 3-4 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: receiving, by an object-based distributed storage system, a request from a client to execute a query with respect to data stored at the distributed storage system; executing the query to produce a result object; storing the result object at the distributed storage system; transmitting the result object to the client; and re-executing the query at a subsequent point in time to update the result object; and transmitting the updated result object to the client.

Example 2 is a method of example 1, wherein the result object is created by executing the query, and wherein the result object comprises data resulting from executing the query.

Example 3 is a method of example 1, wherein the query specifies a duration parameter specifying a window of time, and wherein a creation time of each data record retrieved by the query is within the window of time.

Example 4 is a method of example 1, wherein the query specifies an aggregation parameter for aggregating data retrieved by the query.

Example 5 is a method of example 1, wherein re-executing the query comprises appending new data resulting from re-executing the query to the result object.

Example 6 is a method of example 1, wherein re-executing the query to update the contents of the result object comprises replacing the contents of the result object with new data resulting from re-executing the query.

Example 7 is a method of example 1, wherein the query is a SQL query and wherein the query is re-executed periodically in view of a predetermined condition.

Example 8 is a method of example 1 further comprising: compiling the query into an executable code; storing the executable code associated with the query; and responsive to receiving a second request to re-execute the query at the subsequent point in time, executing the executable code associated with the query at the subsequent point in time with respect to the data stored at the distributed storage system.

Example 9 is a method of example 1, wherein the result object comprises one or more portions, each portion of the one or more portions is associated with a corresponding version number that is reflective of a most recent update of a respective portion.

Example 10 is a method of example 9, wherein the result object is associated with a corresponding version number of each of the one or more portions using a mapping table.

Example 11 is a system comprising: a memory; and a processing device operatively coupled to the memory, wherein the processing device is further to: receive, by an object-based distributed storage system, a request from a client to execute a query with respect to data stored at the distributed storage system; determine whether an executable code corresponding to the query is cached at the object-based distributed storage system; responsive to determining that the executable code corresponding to the query is cached at the object-based distributed storage system, retrieve, from an object repository of the object-based distributed storage system, a result object associated with the executable code corresponding to the query, wherein the result object comprises one or more portions stored separately at the distributed storage system; and transmit the result object to the client.

Example 12 is a system of example 11, wherein the processing device is further to: re-execute the query at a subsequent point in time to update contents of the result object; and transmit the updated result object to the client.

Example 13 is a system of example 11, wherein the query is cached at the object-based distributed storage system responsive to receiving a request from a second client to execute the query.

Example 14 is a system of example 11, wherein the query is a SQL query and wherein the query is re-executed periodically in view of a predetermined condition.

Example 15 is a system of example 11, wherein each portion of the one or more portions of the result object is associated with a corresponding version number that is reflective of a most recent update of a respective portion.

Example 16 is a non-transitory computer-readable storage medium comprising executable instructions that, when executed by a processing device, cause the processing device to: receive, by an object-based distributed storage system, a request from a client to execute a query with respect to data stored at the distributed storage system; execute the query to produce a result object; store the result object at the distributed storage system; transmit the result object to the client; and re-execute the query at a subsequent point in time to update the result object; and transmit the updated result object to the client.

Example 17 is a non-transitory computer-readable storage medium of example 16, wherein the result object is created by executing the query, and wherein the result object comprises data resulting from executing the query.

Example 18 is a non-transitory computer-readable storage medium of example 16, wherein the query specifies a duration parameter specifying a window of time, and wherein a creation time of a data record retrieved by the query is within the window of time.

Example 19 is a non-transitory computer-readable storage medium of example 16, wherein re-executing the query to update the contents of the result object comprises appending new data resulting from re-executing the query to the result object.

Example 20 is a non-transitory computer-readable storage medium of example 16, wherein the processing device is further to: compile the query into an executable code; store the executable code associated with the query; and responsive to receiving a second request to re-execute the query at the subsequent point in time, execute the executable code associated with the query at the subsequent point in time with respect to the data stored at the distributed storage system.

Example 21 is an apparatus comprising: a means to receive, by an object-based distributed storage system, a request from a client to execute a query with respect to data stored at the distributed storage system; a means to execute the query to produce a result object; a means to store the result object at the distributed storage system; transmit the result object to the client; and a means to re-execute the query at a subsequent point in time to update the result object; and a means to transmit the updated result object to the client.

Example 22 is an apparatus of example 21, wherein the result object is created by executing the query, and wherein the result object comprises data resulting from executing the query.

Example 23 is an apparatus of example 21, wherein the query specifies a duration parameter specifying a window of time, and wherein a creation time of a data record retrieved by the query is within the window of time.

Example 24 is an apparatus of example 21, wherein the means to re-execute the query to update the contents of the result object comprises a means to append new data resulting from re-executing the query to the result object.

Example 25 is an apparatus of example 21 further comprising a means to compile the query into an executable code; a means to store the executable code associated with the query; and responsive to receiving a second request to re-execute the query at the subsequent point in time, a means to execute the executable code associated with the query at the subsequent point in time with respect to the data stored at the distributed storage system.

Example 26 is an apparatus of example 21, wherein the means to re-execute the query comprises a means to append new data resulting from re-executing the query to the result object.

Example 27 is an apparatus of example 21, wherein the means to re-execute the query to update the contents of the result object comprises a means to replace the contents of the result object with new data resulting from re-executing the query.

Example 28 is an electronic device comprising: a memory; and a processing device operatively coupled to the memory, wherein the processing device is further to: receive, by an object-based distributed storage system, a request from a client to execute a query with respect to data stored at the distributed storage system; determine whether an executable code corresponding to the query is cached at the object-based distributed storage system; responsive to determining that the executable code corresponding to the query is cached at the object-based distributed storage system, retrieve, from an object repository of the object-based distributed storage system, a result object associated with the executable code corresponding to the query, wherein the result object comprises one or more portions stored separately at the distributed storage system; and transmit the result object to the client.

Example 29 is an electronic device of example 28, wherein the processing device is further to: re-execute the query at a subsequent point in time to update contents of the result object; and transmit the updated result object to the client.

Example 30 is an electronic device of example 28, wherein the query is cached at the object-based distributed storage system responsive to receiving a request from a second client to execute the query.

Example 31 is an electronic device of example 28, wherein the query is a SQL query and wherein the query is re-executed periodically in view of a predetermined condition.

Example 32 is an electronic device of example 28, wherein each portion of the one or more portions of the result object is associated with a corresponding version number that is reflective of a most recent update of a respective portion.

Example 33 is an electronic device of example 28, wherein the result object comprises data resulting from executing the query.

Example 34 is an electronic device of example 28, wherein the query specifies a duration parameter specifying a window of time, and wherein a creation time of a data record retrieved by the query is within the window of time.

What is claimed is:

1. A method comprising:
   receiving, by a distributed storage system, a request from a client to execute a query with respect to data stored at the distributed storage system, wherein the query specifies a duration parameter and an aggregation parameter, the duration parameter specifying a window of time;
   executing the query to produce a result object, wherein the result object comprises data resulting from the executing the query;
   storing the result object at the distributed storage system;
   transmitting the result object to the client;
   re-executing the query at a subsequent point in time to update the result object, wherein the result object is divided into a plurality of portions, and wherein each portion of the plurality of portions is associated with one version number of a plurality of version numbers;
   responsive to updating a portion of the plurality of portions of the result object, updating a version number associated with the portion of the result object;
   identifying, based on a corresponding version number, a most recently updated portion of the result object;
   aggregating, according to the duration parameter and the aggregation parameter, the most recently updated portion into the updated result object; and
   transmitting, to the client, the updated result object.

2. The method of claim 1, wherein the result object is created by executing the query.

3. The method of claim 1, wherein a creation time of each data record retrieved by the query is within the window of time.

4. The method of claim 1, wherein the aggregation parameter specifies a manner for aggregating data retrieved by the query.

5. The method of claim 1, wherein re-executing the query comprises appending new data resulting from re-executing the query to the result object.

6. The method of claim 1, wherein re-executing the query to update contents of the result object comprises replacing the contents of the result object with new data resulting from re-executing the query.

7. The method of claim 1, wherein the query is a SQL query and wherein the query is re-executed periodically in view of a predetermined condition.

8. The method of claim 1 further comprising:
   compiling the query into an executable code;
   storing the executable code associated with the query; and
   responsive to receiving a second request to re-execute the query at the subsequent point in time, executing the executable code associated with the query at the subsequent point in time with respect to the data stored at the distributed storage system.

9. The method of claim 1, wherein each portion of the plurality of portions of the updated result object is associated with a corresponding version number that is reflective of a most recent update of a respective portion.

10. The method of claim 9, wherein the result object is associated with a corresponding version number of each portion of the plurality of portions using a mapping table.

11. A system comprising:
    a memory; and
    a processing device operatively coupled to the memory, wherein the processing device is further to:
       receive, by an object-based distributed storage system, a request from a client to execute a query with respect to data stored at the distributed storage system, wherein the query specifies a duration parameter and an aggregation parameter, the duration parameter specifying a window of time;
       determine whether an executable code corresponding to the query is cached at the object-based distributed storage system;
       responsive to determining that the executable code corresponding to the query is cached at the object-based distributed storage system, retrieve, from an object repository of the object-based distributed storage system, a result object associated with the executable code corresponding to the query, wherein the result object is divided into a plurality of portions stored separately at the distributed storage system, and wherein each portion of the plurality of portions is associated with one version number of a plurality of version numbers, and wherein the result object comprises data resulting from the executing the query;
       transmit the result object to the client;
       re-execute the query at a subsequent point in time to update the result object;
       responsive to updating a portion of the plurality of portions of the result object, update a version number associated the portion of the result object;
       identify, based on a corresponding version number, a most recently updated portion of the result object;
       aggregate, according to the duration parameter and the aggregation parameter, the most recently updated portion into the updated result object; and
       transmit, to the client, the updated result object.

12. The system of claim 11, wherein the executable code corresponding to the query is cached at the object-based distributed storage system responsive to receiving a request from a second client to execute the query.

13. The system of claim 11, wherein the query is a SQL query and wherein the query is re-executed periodically in view of a predetermined condition.

14. The system of claim 11, wherein each portion of the plurality of portions of the updated result object is associated with a corresponding version number that is reflective of a most recent update of a respective portion.

15. A non-transitory computer-readable storage medium comprising executable instructions that, when executed by a processing device, cause the processing device to:
receive, by a distributed storage system, a request from a client to execute a query with respect to data stored at the distributed storage system, wherein the query specifies a duration parameter and an aggregation parameter, the duration parameter specifying a window of time;
execute the query to produce a result object, and wherein the result object comprises data resulting from the executing the query;
store the result object at the distributed storage system;
transmit the result object to the client;
re-execute the query at a subsequent point in time to update the result object, wherein the result object is divided into a plurality of portions, and wherein each portion of the plurality of portions is associated with one version number of a plurality of version numbers;
responsive to updating a portion of the plurality of portions of the result object, update a version number associated with the portion of the result object;
identify, based on a corresponding version number, a most recently updated portion of the result object;
aggregate, according to the duration parameter and the aggregation parameter, the most recently updated portion into the updated result object; and
transmit, to the client, the updated result object.

16. The non-transitory computer-readable storage medium of claim 15, wherein the result object is created by executing the query.

17. The non-transitory computer-readable storage medium of claim 15, wherein a creation time of a data record retrieved by the query is within the window of time.

18. The non-transitory computer-readable storage medium of claim 15, wherein re-executing the query to update the contents of the result object comprises appending new data resulting from re-executing the query to the result object.

19. The non-transitory computer-readable storage medium of claim 15, wherein the processing device is further to:
compile the query into an executable code;
store the executable code associated with the query; and
responsive to receiving a second request to re-execute the query at the subsequent point in time, execute the executable code associated with the query at the subsequent point in time with respect to the data stored at the distributed storage system.

20. The method of claim 1, wherein the query specifies a re-execution frequency parameter specifying a frequency of re-executing the query, wherein re-executing the query at the subsequent point in time is performed based on the re-execution frequency parameter.

* * * * *